United States Patent [19]
Hornfeld et al.

[11] Patent Number: 5,523,569
[45] Date of Patent: Jun. 4, 1996

[54] APPARATUS FOR DETECTING LEAKAGES IN STRUCTURAL MEMBERS

[75] Inventors: Willi Hornfeld, Wildeshausen; Helmut Grobecker, Stuhr; Dietmar Meyer, Bremen, all of Germany

[73] Assignee: STN Atlas Electronik GmbH, Bremen, Germany

[21] Appl. No.: 355,631

[22] Filed: Dec. 14, 1994

[51] Int. Cl.$^6$ .............................. G01M 3/04; G01M 3/38
[52] U.S. Cl. ...................................... 250/330; 250/338.5
[58] Field of Search ................................... 250/330, 338.5

[56] References Cited

U.S. PATENT DOCUMENTS

| | | |
|---|---|---|
| 3,085,423 | 4/1963 | Champion . |
| 4,555,627 | 11/1985 | McRae, Jr. ........................ 250/330 X |
| 4,772,789 | 9/1988 | Maram et al. ........................ 250/330 |
| 5,001,346 | 3/1991 | Barkhoudarian ........................ 250/330 |
| 5,430,293 | 7/1995 | Sato et al. ........................ 250/330 |

FOREIGN PATENT DOCUMENTS

| | | |
|---|---|---|
| 0536586 | 4/1993 | European Pat. Off. . |
| 4111686 | 10/1992 | Germany . |

*Primary Examiner*—Carolyn E. Fields
*Assistant Examiner*—Edward J. Glick
*Attorney, Agent, or Firm*—Merchant, Gould, Smith, Edell, Welter & Schmidt

[57] ABSTRACT

An apparatus for detecting leakages in structural members (8) is disclosed. The apparatus includes a device (2) for conveying gas through the structural member (8) to be investigated, a camera (14) having a narrow band filter characteristic matched to the spectral absorption of the gas and a device (16, 18) connected to the camera (14) for processing and displaying the recorded image of the structural member (8) to be investigated.

9 Claims, 1 Drawing Sheet

APPARATUS FOR DETECTING LEAKAGES IN STRUCTURAL MEMBERS

BACKGROUND OF THE INVENTION

The invention relates to an apparatus for detecting leakages in structural members.

The detection of leakages in structural members is absolutely necessary both in quality inspection in manufacture and also in operation. The detection of leakages in structural members which are used in an environment with low or excess pressure is particularly critical.

Processes and apparatuses for leakage detection which are nowadays customary and are used in particular in manufacture are either expensive, difficult to operate, too imprecise or use toxic media for the detection of leakages, which is problematical because of the danger to service personnel and the environment.

SUMMARY OF THE INVENTION

The object of the present invention is therefore to create an apparatus for the detection of leakages in structural members which is relatively cheap, can be operated easily, in an environmentally friendly manner and without danger to the service personnel and also operates without contact and precisely.

This object is achieved with an apparatus which in accordance with the invention comprises a device for conveying gas through the structural element to be tested, a camera having a narrow band filter characteristic substantially matched to the spectral properties of the gas and a device connected to the camera for processing and displaying the recorded image of the structural member to be tested.

The apparatus specified by the invention, which is particularly suitable for testing hollow structural members, offers a clear detection and localization of leakage points on the basis of the optical detection and the subsequent optoelectronic image processing. Thus the apparatus according to the invention operates in a particularly precise manner. Moreover the apparatus specified by the invention is easy to operate as it works without contact and can be easily adapted to any change in the test environment. Finally the apparatus according to the invention operates in an environmentally friendly manner, and moreover there is no danger to service personnel, as a gas generally recognized as being safe may be used. The advantages mentioned are achieved in accordance with the invention by making absorption operations of gases emerging at a leakage point of the test piece visible with the help of a camera, which comprises a narrow band filter substantially matched with the spectral properties of the gas or corresponding filter properties. As in accordance with the invention the sensitivity of the camera is precisely limited to the absorption bands of the test gas to be detected, a high radiation contrast between the escaping gas and its environment or its background can be achieved.

The optical detection of the gas escaping at leakage points can be further intensified with light by an illumination device for the illumination of the structural member to be tested, with the wave length of the light being substantially matched to the spectral properties.

The apparatus preferably operates in the infrared range.

$CO_2$, $N_2O$ or $SF_6$, for example, is expediently used as a gas generally recognized as safe in the previously encountered definition.

The gas conveying device comprises a flowmeter for the quantitative assessment of the leakage point.

The gas conveying device expediently conveys the gas under pressure through the structural member to be tested.

The structural member to be tested and the camera may preferably moved in relation to one another for the most complete detection possible from all perspectives.

BRIEF DESCRIPTION OF THE DRAWINGS

A preferred exemplified embodiment of the invention is explained in further detail below by means of the attached drawing, in which a schematic block diagram of a preferred design of the apparatus for detecting leakages is represented.

DETAILED DESCRIPTION

Figure 1:
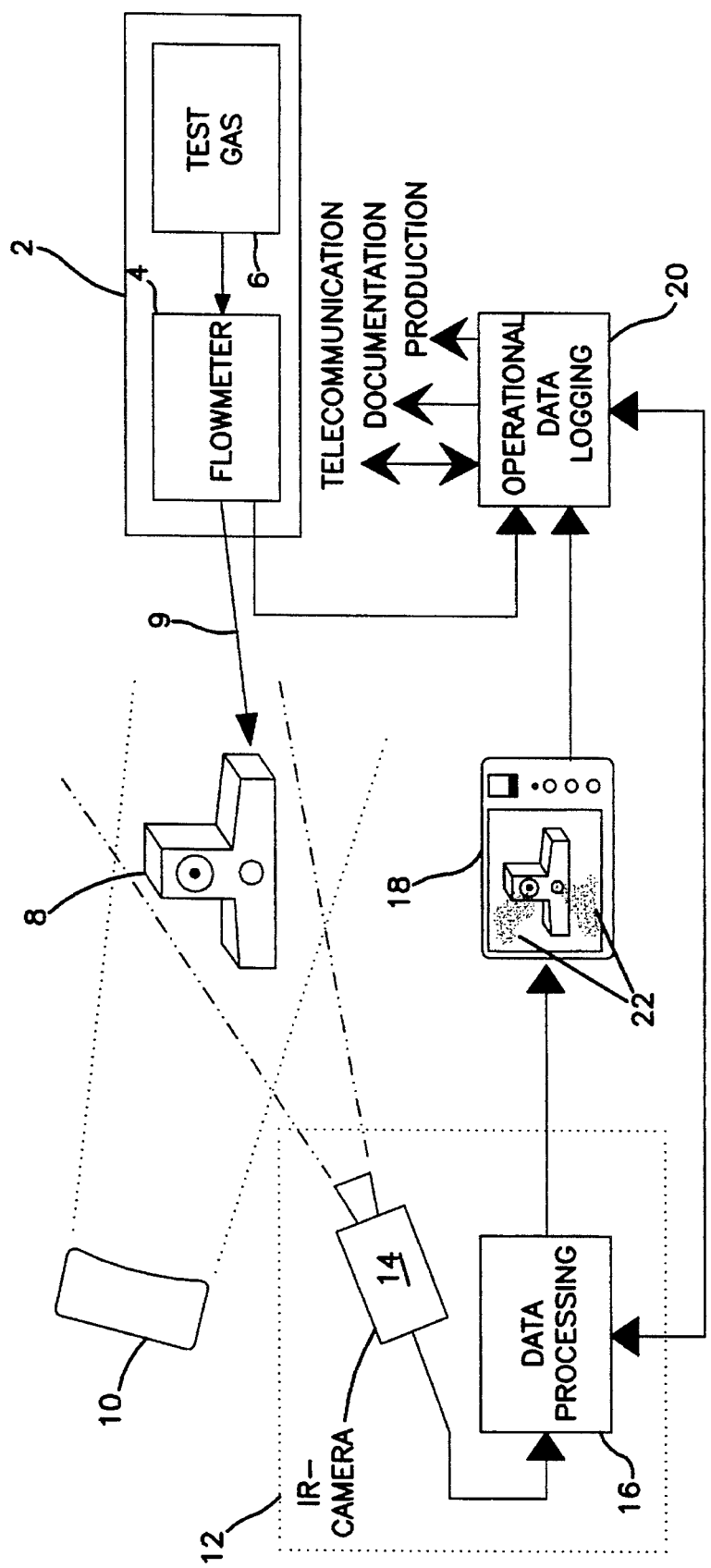

As can be seen from the attached drawing, a gas conveying device 2 is provided, which inter alia comprises a flowmeter 4 and also a container 6 with a test gas. $CO_2$, $SF_6$ or $N_2O$ is preferably used as the test gas. The gas conveying device 2 also comprises a hose, a pipe or another connection means through which the test gas is conveyed into the test piece 8, which in the attached drawings is indicated by the arrow 9.

An illumination device 10, which comprises a quartz projector for example, is also provided. The test piece 8 is irradiated during the test operation by means of the illumination device 10.

A photographic device 12 comprises an infrared camera 14, which preferably operates in the wavelength range of from 1 to 5 μm 8 to 12 μm. The infrared camera 14 is provided with a narrow band filter adapted to the test gas, by which the generally broad band spectral sensitivity of the camera 14 is precisely limited to the absorption bands of the test gas to be detected. If $CO_2$, for example, is used as the test gas, the infrared optics should be adapted by the filter to a central wavelength of 4.26 μm. The same also applies for the illumination device, which should preferably produce infrared light with an effective wavelength of roughly 4 μm.

At this juncture it should be pointed out that instead of a filter the infrared optics of the camera 14 may alternatively also be designed so that it possesses the required filter properties itself.

The use of the apparatus described is likewise not limited to infrared. The use of electromagnetic radiation of other wave lengths also appears possible. Furthermore any other detector may be used instead of an optical camera to detect light.

The optical detection device 12 also comprises an integrated or removed image processing device 16 for producing optimal picture quality in black/white or colour and also for the automatic detection of the test gas escaping from a leakage point and the determination of the origin of the leakage by variance comparison or image evaluation adapted to the situation.

A monitor 18 for representing the test piece and the test result with the cloud of gas escaping from the test piece is connected to the image detection device 12.

A data logging device 20 is also provided, which is connected to the data processing device 16 and the flow meter 4 and comprises interfaces for telecommunication and data banks.

The course of the test operation using the apparatus represented is described below.

The test gas contained in the container 6 of the gas conveying device 2 is conveyed into the test piece 8 via corresponding hoses, pipes or other connecting means. This normally occurs under pressure, with the test pressure being adapted to the test piece specifications.

For the opto-electronic recording of the test piece 8 and possible leakage sits, the infrared camera 14 is guided either manually or automatically around the test piece 8 or the test piece 8 itself is moved in front of the camera. The illumination device 10 is either mounted on the camera 14 or is disposed in the vicinity thereof in order to illuminate the test piece 8 with infrared light in the picture detail to be recorded by the camera 14.

The generally wide band spectral sensitivity of the infrared camera 14 is precisely restricted in the aforementioned manner to the absorption bands of the test gas to be detected, so that the highest possible radiation contrast between the escaping cloud of gas 22 and its environment or respectively the background is guaranteed. The radiation contrast is assisted by the external illumination by means of the illumination device 10, which in addition to the thermal characteristic radiation of the test piece under consideration increases the radiation intensities via the detection sensitivity threshold of the camera 14 increased by the filter. This infrared image recorded by the camera 14 is visible as a result of absorption and emission phenomena in the test gas 22.

All images recorded by the camera 14 or alternatively only the images with the leakage sites, which are made visible in the infrared image by escaping test gas 22, are processed, stored and if necessary evaluated by the data processing device 16 and can be represented on the monitor 18. The image representation on the monitor may be in black/white or in colour, preferably in "false colour", with it being possible to mark the cloud of test gas escaping at the leakage point.

The data relating to the recorded images is further processed and transmitted in the data logging device 20, and any leakage points detected may be marked in a special way, for example.

The flow meter 4 is used for the quantitative evaluation of the leakage site, and its measured values are also processed and transmitted by the data logging device 20.

We claim:

1. An apparatus for detecting leakage in structural components, comprising:

a gas conveying device provided to convey $CO_2$ gas through a structural member to be investigated;

an infrared radiation source disposed to irradiate the structural member;

a camera having a narrow band filter characteristic substantially matched to spectral absorption wavelengths of the $CO_2$ gas to obtain a recorded image; and a device coupled to the camera for processing and displaying the recorded image.

2. An apparatus according to claim 1, wherein the gas conveying device comprises a flowmeter.

3. An apparatus according to claim 2, wherein the gas conveying device conveys the $CO_2$ gas under pressure though the structural member.

4. An apparatus according to claim 1, wherein the gas conveying device conveys the $CO_2$ gas under pressure though the structural member.

5. An apparatus according to claim 4, wherein the structural member to be investigated and the camera are movable relative to one another.

6. An apparatus according to claim 1, wherein the structural member to be investigated and the camera are movable relative to one another.

7. An apparatus for detecting leakage in a structural member, comprising:

a source of $CO_2$ gas;

a gas conveying device, coupled to the source of $CO_2$ gas to convey $CO_2$ gas from the source of $CO_2$ gas through the structural member;

a source of infrared electromagnetic radiation arranged to illuminate the structural member;

an imaging device, including a filter tuned to pass a narrow band of wavelengths substantially matched to a spectral absorption band of the $CO_2$ gas, the imaging device producing an image limited to the spectral absorption band of the $CO_2$ gas; and an image processing device for detecting if $CO_2$ gas is leaking from the structural member and for determining an origin of $CO_2$ gas leaking from the structural member.

8. An apparatus as recited in claim 7, wherein a central wavelength of the narrow band of wavelengths is approximately 4.26 μm.

9. An apparatus as recited in claim 8, wherein an effective wavelength of the source of infrared radiation is approximately 4 μm.

* * * * *